(12) United States Patent
Mitsunaga et al.

(10) Patent No.: US 10,913,182 B2
(45) Date of Patent: Feb. 9, 2021

(54) FIBER-REINFORCED RESIN SHAPED PRODUCT HAVING GRAINS ON AT LEAST PART OF SURFACE

(71) Applicant: Teijin Limited, Osaka (JP)

(72) Inventors: Masaki Mitsunaga, Osaka (JP); Akihisa Nomura, Osaka (JP)

(73) Assignee: Teijin Limited, Osaka (JP)

( * ) Notice: Subject to any disclaimer, the term of this patent is extended or adjusted under 35 U.S.C. 154(b) by 187 days.

(21) Appl. No.: 16/066,948

(22) PCT Filed: Dec. 26, 2016

(86) PCT No.: PCT/JP2016/089229
§ 371 (c)(1),
(2) Date: Jun. 28, 2018

(87) PCT Pub. No.: WO2017/115875
PCT Pub. Date: Jul. 6, 2017

(65) Prior Publication Data
US 2019/0009436 A1 Jan. 10, 2019

(30) Foreign Application Priority Data
Dec. 28, 2015 (JP) .................................. 2015-256370

(51) Int. Cl.
*B29C 33/42* (2006.01)
*B29C 37/00* (2006.01)
(Continued)

(52) U.S. Cl.
CPC .......... *B29C 33/42* (2013.01); *B29C 37/0053* (2013.01); *B29C 43/021* (2013.01);
(Continued)

(58) Field of Classification Search
CPC ... B29C 33/42; B29C 43/021; B29C 37/0053; B29C 43/46; B29C 43/36;
(Continued)

(56) References Cited

U.S. PATENT DOCUMENTS

| | | |
|---|---|---|
| 2009/0008529 A1 | 1/2009 | Sugimoto et al. |
| 2014/0186584 A1 | 7/2014 | Arakawa et al. |
| 2015/0004368 A1 | 1/2015 | Witzke et al. |

FOREIGN PATENT DOCUMENTS

| | | |
|---|---|---|
| JP | S63-112120 A | 5/1988 |
| JP | H05-082513 U | 11/1993 |

(Continued)

OTHER PUBLICATIONS

Machine Translation of JP 2003-071884 A. (Year: 2003).*
(Continued)

*Primary Examiner* — Brian Handville
(74) *Attorney, Agent, or Firm* — Banner & Witcoff, Ltd.

(57) ABSTRACT

A fiber-reinforced resin shaped product includes: reinforcing fibers with a weight average fiber length of 100 mm or less; and a thermoplastic resin. The fiber-reinforced resin shaped product has grains on at least a part of a surface thereof. A maximum height (Rz) of the grains is 100 μm to 200 μm, and an average pitch (Rsm) between adjacent grains is 1100 μm or less.

14 Claims, 2 Drawing Sheets

(51) Int. Cl.
*B29C 43/02* (2006.01)
*B29C 43/36* (2006.01)
*B29C 43/46* (2006.01)
*B29K 101/12* (2006.01)
*B29L 31/30* (2006.01)
*B29K 105/12* (2006.01)
*B29K 77/00* (2006.01)
*B29K 105/14* (2006.01)
*B29K 307/04* (2006.01)

(52) U.S. Cl.
CPC .............. *B29C 43/36* (2013.01); *B29C 43/46* (2013.01); *B29C 2043/025* (2013.01); *B29K 2077/00* (2013.01); *B29K 2101/12* (2013.01); *B29K 2105/128* (2013.01); *B29K 2105/14* (2013.01); *B29K 2307/04* (2013.01); *B29K 2995/0074* (2013.01); *B29L 2031/30* (2013.01)

(58) Field of Classification Search
CPC ...... B29C 2043/025; B29C 2995/0074; B29K 2105/128; B29K 2101/12; B29K 2307/04; B29K 2105/14; B29K 2077/00; B29L 2031/30

See application file for complete search history.

(56) References Cited

FOREIGN PATENT DOCUMENTS

| | | |
|---|---|---|
| JP | 2003-071884 A | 3/2003 |
| JP | 2009-013628 A | 1/2009 |

OTHER PUBLICATIONS

Feb. 28, 2017—(PCT/JP) Written Opinion of the International Searching Authority—App 2016/089229—Eng Tran.
Nov. 16, 2018—(EP) Office Action—App 16881849.0.
Nov. 6, 2018—(EP) Supplementary Search Report—App 16881849.0.
Feb. 28, 2017—International Search Report—Intl App PCT/JP2016/089229.

* cited by examiner

FIBER-REINFORCED RESIN SHAPED PRODUCT HAVING GRAINS ON AT LEAST PART OF SURFACE

CROSS REFERENCE TO RELATED APPLICATIONS

This is a U.S. National Phase Application under 35 U.S.C. § 371 of International Application No. PCT/JP2016/089229, filed Dec. 26, 2016, which claims priority to Japanese Application No. 2015-256370, filed Dec. 28, 2015, the entire contents of each of which are incorporated herein by reference.

TECHNICAL FIELD

The present invention relates to a fiber-reinforced resin shaped product having grains on at least a part of a surface, the fiber-reinforced resin shaped product including carbon fibers and a thermoplastic resin and having a good appearance.

BACKGROUND ART

Recently, in the mechanical field, a so-called fiber-reinforced resin material including a resin as a matrix (hereinafter, also referred to as "matrix resin") and reinforcing fibers such as carbon fibers has attracted attention as a composite material. In the fiber-reinforced resin material, the fibers are dispersed in the matrix resin. Therefore, the fiber-reinforced resin material has satisfactory tensile modulus, tensile strength, impact resistance, and the like and is considered to be used as, for example, a structural member of a vehicle or the like. In particular, a fiber-reinforced thermoplastic resin material including a thermoplastic resin as the matrix resin has more satisfactory mass productivity in molding or the like than a fiber-reinforced thermosetting resin material, and thus is considered to be used in various fields. In addition, the fiber-reinforced thermoplastic resin material is molded in a desired shape with high productivity using various molding methods such as injection molding or compression molding. Therefore, the fiber-reinforced thermoplastic resin material is suitable for various uses ranging from large components to small components.

For example, PTL 1 discloses a fiber-reinforced resin shaped product having a good surface appearance and a high strength that has grains on a surface and includes reinforcing fibers with a relatively long fiber length, and a method of manufacturing the shaped product with high productivity by compression-molding a fiber-reinforced thermoplastic resin material.

CITATION LIST

Patent Literature

[PTL 1] US2014/0186584A

SUMMARY OF INVENTION

Technical Problem

The present inventors elaborately observed the appearance of a shaped product that is obtained by compression-molding a fiber-reinforced thermoplastic resin material using a technique of the related art, and found that the impression from the orientation state of reinforcing fibers and the like varies between one region and another region. The present inventors presumed the reason for this to be that, during compression molding, transfer of a surface state from a mold varies between a portion where the fiber-reinforced resin material that is heated and plasticized flows (flowing portion) and a portion where the fiber-reinforced resin material does not flow (non-flowing portion).

An object of the present invention is to provide a fiber-reinforced resin shaped product having a good appearance that has grains on at least a part of a surface (hereinafter, also referred to as "shaped product with grains"). "Good appearance" described herein refers to the appearance of a shaped product in which, for example, a state of reinforcing fibers in a predetermined region is uniform as desired, and also refers to the appearance of a shaped product in which desired appearances that are different between regions are obtained by intentionally changing a state of reinforcing fibers depending on specific regions.

Solution to Problem

Regarding a fiber-reinforced resin shaped product including reinforcing fibers and a thermoplastic resin, the present inventors thought that, in order to suppress a difference in appearance between a non-flowing portion and a flowing portion of the fiber-reinforced resin shaped product and to improve the appearance of the fiber-reinforced resin shaped product, it is important to suppress a difference in orientation of reinforcing fibers between the non-flowing portion and the flowing portion. Focusing on the fact that there is a difference between the amount of reinforcing fibers present in a projection portion forming a grain shape and the amount of reinforcing fibers present in a recess portion or a flat portion, the present invention thought that, in a case where the amount of reinforcing fibers in the projection portion is larger than that in the recess portion or the flat portion, the reinforcing fibers are likely to be caught in the projection portion such that a difference in orientation of reinforcing fibers between the non-flowing portion and the flowing portion can be suppressed, and performed a thorough investigation. As a result, the present inventors found that, in a case where the grains are in a range according to the present invention, a difference in appearance between the non-flowing portion and the flowing portion can be suppressed, thereby completing the present invention. Further, the present inventors found that, in a case where the amount of reinforcing fibers in projection portions of grains of a shaped product with grains according to the present invention is large, the amount of the resin in the easily recognizable projection portions, in other words, the proportion of the amount of the resin with respect to the total amount of the reinforcing fibers and the resin is reduced, and deterioration in appearance caused by weathering deterioration is suppressed, that is, a shaped product with grains having higher weather resistance can be obtained.

That is, the present invention relates to a fiber-reinforced resin shaped product includes: reinforcing fibers with a weight average fiber length of 100 mm or less; and a thermoplastic resin. The fiber-reinforced resin shaped product has grains at least a part of a surface of the fiber-reinforced resin shaped product. A maximum height (Rz) of the grains is 100 μm to 200 μm, and an average pitch (Rsm) between adjacent grains is 1100 μm or less.

Advantageous Effects of Invention

In the fiber-reinforced resin shaped product having grains on at least a part of a surface according to the present invention, grains having a specific dimension are formed. As a result, the appearance is extremely good, deterioration in appearance caused by weathering deterioration is not likely to occur, weather resistance is satisfactory, and dimensional stability is satisfactory.

DESCRIPTION OF EMBODIMENTS

Hereinafter, an embodiment of the present invention will be sequentially described appropriately with reference to the drawings. The dimensions in the drawings are not necessarily the same as the actual ones. In the photographs of the drawings, hue, lightness, saturation, and the like are adjusted, in order to make the grain appearance clearly seen.
(Grains)

Grains according to the present invention refer to a pattern that is formed on a surface of a fiber-reinforced resin shaped product. The pattern is not particularly limited, and may be formed of regular unevenness or/and wrinkles or may be formed of irregular unevenness or/and wrinkles. For example, the regular shape may be a lattice shape, and the irregular shape may be a leather shape.

A fiber-reinforced resin shaped product according to the present invention includes: reinforcing fibers with a weight average fiber length of 100 mm or less; and a thermoplastic resin, the fiber-reinforced resin shaped product having grains on at least a part of a surface of the fiber-reinforced resin shaped product, in which a maximum height (Rz) of the grains is 100 µm to 200 µm, and an average pitch (Rsm) between adjacent grains is 1100 µm or less. Regarding the present invention, "grains" may also be referred to as "grain portion" for convenience of description.

By having the grains on at least a part of the surface of the fiber-reinforced resin shaped product according to the present invention, the fiber-reinforced resin shaped product (shaped product with grains) has a good appearance.

Regarding the at least a part of the surface of the shaped product with grains according to the present invention, a region with grains or an area ratio of the region with grains to the total surface area of the shaped product with grains is not particularly limited. The shaped product with grains according to the present invention may be a shaped product having the grains on a necessary surface region according to the purpose or, of course, may be a shaped product having the grains on the entire surface. In particular, it is preferable that grains are formed on a region that becomes an appearance portion and is exposed to a light such as sunlight, wind and rain, change in temperature, or change in humidity when the shaped product with grains according to the present invention is used for a predetermined application.

In the present invention, it is important that the maximum height (Rz) of the grains is 100 µm to 200 µm, that is, 100 µm or more and 200 µm or less. It is industrially not preferable the maximum height (Rz) of the grains is more than 200 µm because it is difficult to impart a grain shape to a mold, and it is difficult to obtain a shaped product with grains having the grain shape. The maximum height (Rz) of the grains is preferably 100 µm to 190 µm, more preferably 100 µm to 180 µm, and still more preferably 100 µm to 150 µm. In a case where the maximum height (Rz) of the grains is more than 100 µm or more, the reinforcing fibers are not likely to appear on the grain surface, and a difference in appearance between a flowing portion and a non-flowing portion in the shaped product is more likely to be reduced. Regarding the present invention, it is preferable that the maximum height (Rz) of the grains is a value calculated according to JIS B 0601 (2001). In the present invention, in a case where the average pitch (Rsm) between adjacent grains, that is, between one grain and another grain adjacent to the grain is more than 1100 µm, reinforcing fibers appear on a recess portion or a flat portion constituting the grain shape, and a difference in appearance between the flowing portion and the non-flowing portion appears. The average pitch (Rsm) between adjacent grains is preferably 200 µm to 1100 µm and more preferably 200 µm to 1000 µm. It is industrially preferable that the average pitch (Rsm) between adjacent grains is 200 µm or more because it is easy to impart a grain shape to a mold.

In the present invention, it is preferable that a grain projected area % (Sg) is 10% to 99%, the grain projected area % being defined as a proportion of a projected area of grains per predetermined surface area, for example, 100 mm×100 mm of the shaped product with grains. In a case where the grain projected area % (Sg) is 10% or higher, the amount of grains is sufficient, and an effect of suppressing deterioration in appearance caused by weathering deterioration is particularly significant. It is industrially preferable that the grain projected area % (Sg) is 99% or lower because the amount of grains is not excessively large, and it is easy to impart a grain shape to a mold. The grain projected area % (Sg) of the shaped product with grains according to the present invention is more preferably 20% to 90% and still more preferably 20% to 80%.

The grain projected area % (Sg) may be in the above-described range in the entire area of the surface of the shaped product with grains, or may be in the above-described range in a specific surface or a specific region of the surface of the shaped product with grains. The specific surface or the specific region of the surface of the shaped product with grains is, for example, a surface or a region that becomes an appearance portion and is exposed to a light such as sunlight, wind and rain, change in temperature, or change in humidity in a case where the shaped product with grains is used for a predetermined application. Regarding the shaped product with grains according to the present invention, a draft angle of the grains is preferably 0.1 degrees to 20 degrees, more preferably 0.5 degrees to 15 degrees, and still more preferably 1 degree to 10 degrees. It is preferable that the draft angle is 0.1 degrees or higher because mold release during molding is easily performed. It is preferable that the draft angle is 20 degrees or lower because the grains are easily recognized as a pattern, and surface appearance is good. In addition, as a method of promoting mold release during molding, a method of increasing R of a grain shape may be adopted. In a case where the grain shape has a high aspect ratio, for example, has a long axis direction and a short axis direction, it is preferable that the above-described features of the grains in the present invention are satisfied in the short axis direction.

In the shaped product with grains according to the present invention, it is preferable that a thermoplastic resin proportion (hereinafter, simply may be referred to as "resin proportion) in the grains is lower than a thermoplastic resin proportion in an inner portion of the shaped product with grains. That is, the resin proportion in the surface where the grains are provided is lower than the resin proportion in a center portion of the shaped product with grains that is deeper in a thickness direction than the surface where the grains are provided. In a case where the resin proportion in the grains is low, the orientation of the reinforcing fibers is disturbed in the flowing portion and the non-flowing portion. Therefore, the difference in appearance is reduced, and an effect of suppressing a change in appearance caused by a decrease in resin proportion due to weathering deterioration is obtained. The resin proportion in the grains is preferably lower than the resin proportion in the inner portion by 1 vol % or higher, that is, "(the resin proportion (vol %) in the inner portion)−(the resin proportion (vol %) in the grains)" is preferably 1 vol % or higher, more preferably 2 vol % or higher, and still more preferably 4 vol % or higher. Conversely, it is preferable that the resin proportion in the grains is lower than the resin proportion in the inner portion by 10 Vol % or lower because the appearance of the shaped product with grains is not likely to deteriorate. In the shaped product with grains according to the present invention, the resin proportion in the grains is lower than the resin proportion in the inner portion by preferably 1 vol % to 10 vol %, more preferably 1 vol % to 5 vol %, and still more preferably 2 vol % to 5 vol %. In other words, in the shaped product with grains according to the present invention, "(the resin proportion (vol %) in the grains)−(the resin proportion (vol %) in the inner portion)" is preferably −1 vol % to −10 vol %, more preferably −1 vol % to −5 vol %, and still more preferably −2 vol % to −5 vol %.

Regarding the present invention, the resin proportion in the grains may also be referred to as "the resin proportion in the grain portion".

In a case where a thermoplastic resin that is a matrix in the shaped product with grains according to the present invention is a crystalline resin, as described in Examples, the resin proportion in the grains and the resin proportion in the inner portion may be obtained by collecting samples from the grains and the inner portion of the shaped product with grains, respectively, and obtaining heat of fusion of each of the samples by differential scanning calorimetry.

In a case where a thermoplastic resin that is a matrix in the shaped product with grains according to the present invention is an amorphous resin, the resin proportion in the grains and the resin proportion in the inner portion may be obtained by collecting samples from the grains and the inner portion of the shaped product with grains, respectively, and obtaining the reinforcing fiber proportion by thermogravimetry.

The shaped product with grains according to the present invention may have a plurality of regions having different grain shapes on a surface, or may have a plurality of regions having grains having the same shape or different shapes, the regions being separated from and not adjacent to each other.

In a case where the shaped product with grains according to the present invention has grains in a plurality of regions, as long as the requirements of the maximum height (Rz) and the average pitch (Rsm) are satisfied in at least one of the regions, the requirements may not be satisfied in the other regions. However, it is preferable that the requirements are satisfied in all the regions.

In the shaped product with grains according to the present invention, it is more preferable a maximum height (Rz) of the grains is 100 μm to 200 μm, an average pitch (Rsm) between adjacent grains is 200 μm to 1100 μm, and a grain projected area % (Sg) is 20% to 90% because the characteristics such as a good appearance become more significant.

In the shaped product with grains according to the present invention, it is still more preferable that the reinforcing fibers are two-dimensionally randomly oriented, a maximum height (Rz) of the grains is 100 μm to 200 μm, an average pitch (Rsm) between adjacent grains is 200 μm to 1100 μm, and a grain projected area % (Sg) is 20% to 90% because the characteristics such as a good appearance become more significant.

The shaped product with grains according to the present invention has satisfactory weather resistance by having the above-described specific grains, and thus is also suitable for an outdoor use such as an exterior component of a vehicle. The satisfactory weather resistance refers to satisfactory UV resistance.

The shaped product with grains according to the present invention can have satisfactory dimensional stability by having the above-described specific grains. For example, the satisfactory dimensional stability of the shaped product represents that warpage is small with respect to a desired shape, and is extremely advantageous in obtaining a final product using the shaped product by assembly or processing.

(Shaped Product with Grains)

The shaped product with grains according to the present invention has the above-described grains on at least a part of a surface and includes reinforcing fibers with a weight average fiber length of 100 mm or more and a thermoplastic resin.

Preferable examples of the reinforcing fibers and the thermoplastic resin included in the shaped product with grains according to the present invention will be described below together with preferable examples of the reinforcing fibers and the thermoplastic resin included in a fiber-reinforced resin material that is a molding material. In the shaped product with grains according to the present invention, a preferable range of the amount (parts by weight) of the thermoplastic resin with respect to 100 parts by weight of the reinforcing fibers is the same as described below regarding the fiber-reinforced resin material.

A volume fraction of the reinforcing fibers included in the shaped product with grains according to the present invention is not particularly limited. Regarding the reinforcing fibers and the thermoplastic resin that is the matrix, a volume fraction (Vf) of the reinforcing fibers defined by the following Expression (b) is preferably 5% to 80% and more preferably 20% to 60%.

$Vf=100\times(\text{Volume of Reinforcing Fibers})/((\text{Volume of Reinforcing Fibers})+(\text{Volume of Thermoplastic Resin}))$      Expression (b)

It is preferable that Vf in the shaped product with grains is higher than 5% because a reinforcing effect obtained by the reinforcing fibers is sufficiently exhibited. It is preferable that Vf is 80% or lower because voids are not likely to be formed in the obtained shaped product with grains, and deterioration in physical properties is not likely to occur. In a case where Vf in the shaped product with grains varies depending on regions, it is preferable that an average value of Vf is in the above-described range, and it is more preferable that both a minimum value and a maximum value of Vf are in the above-described range.

In a case where the shaped product with grains according to the present invention is obtained by molding the fiber-reinforced resin material as described below, as long as a fiber-reinforced resin material, reinforcing fibers, or a thermoplastic resin other than the above-described fiber-reinforced resin material is not added, Vf in the fiber-reinforced resin material can be considered as Vf in the shaped product with grains.

The shape of the shaped product with grains according to the present invention is not particularly limited, and may be a flat shape or a three-dimensional shape, may be a so-called standing portion such as a rib or a boss, or may be a curved portion, a hole portion, a portion having different thicknesses, or a portion having a deep-drawn shape.

The thickness of the shaped product with grains according to the present invention is not particularly limited, and, typically, is preferably 0.01 mm to 100 mm, more preferably 0.01 mm to 50 mm, still more preferably 0.01 mm to 10 mm, still further preferably 0.01 mm to 5 mm, even more preferably 0.1 mm to 5 mm, and especially more preferably 1 mm to 3 mm. In a case where the thickness of the shaped product varies depending on regions, it is preferable that an average thickness is in the above-described range, and it is more preferable that both a minimum value and a maximum value of the thickness are in the above-described range. The size of the shaped product according to the present invention is not particularly limited and is appropriately set according to the use.

In the shaped product with grains according to the present invention, among values of tensile modulus in an arbitrary direction and a direction perpendicular to the arbitrary direction (hereinafter, also may be referred to as "0 degree direction" and "90 degree direction", respectively), a ratio (hereinafter, abbreviated as "Eδ value") obtained by dividing a higher value by a lower value is preferably lower than 2, more preferably 1.5 or lower, and still more preferably 1.3 or lower. Eδ is an index representing isotropy of a material. In a case where Eδ is lower than 2, the material is evaluated as being isotropic. In a case where Eδ is lower than 1.5, the material is evaluated as being highly isotropic. In a case where Eδ is 1.3 or lower, the material is evaluated as being particularly highly isotropic. As can be clearly seen from the definition, a minimum value of the Eδ value is 1.0.

The shaped product with grains according to the present invention may be further imparted with a desired shape, and optionally may be further press-molded in order to improve surface properties. For example, so-called insert molding may be performed in which the shaped product with grains is disposed in a mold of an injection molding machine, a resin material is inserted, and injection molding is performed to provide a special shape in a given portion.

(Method of Manufacturing Shaped Product with Grains)

Examples of a method of manufacturing the fiber-reinforced resin shaped product (shaped product with grains) according to the present invention include a method of molding the fiber-reinforced resin material described below.

Regarding the present invention, a specific method of molding the fiber-reinforced resin material is not particularly limited. For example, press-molding (compression molding) is preferable because breakage of the reinforcing fibers in the fiber-reinforced resin material is not likely to occur, and productivity and isotropy of a molding material are easily maintained. In particular, so-called cold press molding is preferable from the viewpoint of high productivity, in which the fiber-reinforced resin material, which is heated and plasticized immediately before molding, is disposed in a mold having a temperature adjusted to be lower than a plasticizing temperature of the fiber-reinforced resin material, and the mold is clamped to obtain a shaped product. Examples of a method of heating the fiber-reinforced resin material include a method using a hot air heater or an infrared heater.

A specific example of the cold press molding is as follows: the fiber-reinforced resin material is heated to a plasticizing temperature, which is in a range of (a softening temperature of the thermoplastic resin that is the matrix of the fiber-reinforced resin material+30° C.) to (a decomposition temperature of the thermoplastic resin or lower), to be plasticized; the fiber-reinforced resin material is disposed in a mold that is formed of a pair of an upper die and a lower die and has a temperature adjusted to the softening temperature or lower of the thermoplastic resin; the mold is clamped to press the fiber-reinforced resin material; and the mold is opened and the cooled and solidified shaped product is taken out from the mold.

In the cold press molding, the temperature (heating temperature) at which the fiber-reinforced resin material is heated and plasticized is preferably in a range of (the softening temperature+15° C.) to (the decomposition temperature−30° C.). It is preferable that the heating temperature is in the above-described range because the matrix resin is easily molded by being sufficiently melted and plasticized and the thermoplastic resin is not sufficiently decomposed.

In the cold press molding, as pressing conditions, a press pressure is preferably 0.1 MPa to 20 MPa, more preferably 0.2 MPa to 15 MPa, and still more preferably 0.5 MPa to 10 MPa. In a case where the press pressure is 0.1 MPa or higher, the fiber-reinforced resin material is sufficiently pressed. Therefore, spring back or the like is not likely to occur, and a decrease in material strength is not likely to occur. In addition, it is economically preferable that the pressure is 20 MPa or lower because, for example, even in a case where the fiber-reinforced resin material is large, press molding can be performed using a general press machine in many cases without using an extremely large special press machine. In addition, the internal temperature of the mold during pressing varies depending on the kind of the thermoplastic resin material, and is preferably lower than the softening temperature of the thermoplastic resin that is the matrix of the thermoplastic resin material by 20° C. or lower in order to obtain the fiber-reinforced resin shaped product by cooling and solidifying the melted thermoplastic resin material. Regarding the present invention, the softening temperature of the resin refers to a crystalline melting temperature, that is, a melting point in the case of a crystalline thermoplastic resin, and refers to a glass transition point in the case of an amorphous thermoplastic resin.

Hereinabove, the conditions of the cold press molding have been described in detail. However, the shaped product with grains according to the present invention can be manufactured by hot press molding. In a case where the shaped product with grains according to the present invention is manufactured by hot press molding, it is preferable that heating and pressing conditions are set according to the conditions of the cold press molding.

As a method of manufacturing the fiber-reinforced resin shaped product having grains on at least a part of a surface according to the present invention, a method of obtaining a shaped product having a surface to which a grain shape of a mold surface is transferred using a mold having the grain shape in the press-molding is preferable. The mold having the grain shape refers to a mold in which the corresponding grain shape is formed on a portion of a cavity corresponding to a portion of the shaped product where the grains are provided. For the appearance of the grains, not only the pattern but also glossiness are also important. The glossiness may be changed by polishing or roughening unevenness of grain surfaces of the mold having a grain shape. In a case where the mold having a grain shape adjusted as described above is stored in a long period of time, the appearance may deteriorate due to rust or dust. Therefore, during the long-term storage, a rust inhibitor may be applied to the mold, a plastic film that does not allow permeation of water may be wound around the mold, or the mold may be coated with a solid oil. Further, in order to improve maintenance, the mold having a grain shape may be protected in advance using chromium or silicon coating or the like.

In general, a grain pattern of a mold can be determined by selecting a grain depth and a draft angle of grains according to a pattern number of grains designated by a manufacturer, and specifications thereof can be designated in consideration of glossiness and maintenance.

As long as the above-described shaped product with grains can be obtained, the shaped product with grains may be obtained, for example, by manufacturing a fiber-reinforced resin shaped product having no grains by press molding first, heating an object having a grain shape, and pressing the heated object toward a predetermined portion of the shaped product.

(Fiber-Reinforced Resin Material)

The fiber-reinforced resin material used in the present invention includes reinforcing fibers and a thermoplastic resin that is a matrix resin.

The abundance of the thermoplastic resin that is the matrix resin of the fiber-reinforced resin material can be appropriately determined depending on the kind of the thermoplastic resin, the kind of the reinforcing fibers, and the like and is not particularly limited. Typically, the abundance of the thermoplastic resin is preferably in a range of 3 parts by weight to 1000 parts by weight with respect to the 100 parts by weight of the reinforcing fibers. The abundance of the thermoplastic resin with respect to 100 parts by weight of the reinforcing fibers in the fiber-reinforced resin material is more preferably 30 parts by weight to 200 parts by weight and still more preferably 30 parts by weight to 150 parts by weight. In a case where the abundance of the matrix resin with respect to 100 parts by weight of the reinforcing fibers is 3 parts by weight or more, impregnation progresses sufficiently, and the amount of dry reinforcing fibers tends to decrease. In a case where the abundance of the matrix resin with respect to 100 parts by weight of the reinforcing fibers is 1000 parts by weight or less, the amount of the reinforcing fiber is sufficient, and the reinforcing fibers function appropriately as a structural material. In the shaped product with grains or the fiber-reinforced resin material according to the present invention, in a case where the abundance of the thermoplastic resin with respect to 100 parts by weight of the reinforcing fibers varies depending on regions, it is preferable that the abundance in all the regions of the shaped product with grains or the fiber-reinforced resin material is in the above-described range. Regarding the present invention, the amount is represented by weight for convenience of description but, to be exact, should be expressed by mass.

Examples of the orientation state of the reinforcing fibers in the fiber-reinforced resin material include: one-direction orientation in which long axis directions of the reinforcing fibers are oriented to one direction; and two-dimensional random orientation in which the long axis directions are randomly oriented in an in-plane direction of the fiber-reinforced resin material.

The orientation state of the reinforcing fibers in the present invention may be the one-direction orientation or the two-dimensional random orientation. In addition, irregular orientation that is an intermediate state between the one-direction orientation and the two-dimensional random orientation (orientation state in which long axis directions of the reinforcing fibers are not completely oriented to one direction and are not completely random) may be adopted. Further, regarding the fiber length of the reinforcing fibers, the reinforcing fibers may be oriented such that the long axis directions thereof form an angle with respect to the in-plane direction of the fiber-reinforced resin material, may be oriented such that the fibers are entangled in a cotton shape, or may be oriented in a shape of bidirectional woven fabric such as plain weave fabric or twill weave fabric, multi-axial woven fabric, non-woven fabric, mat, knit, braid, or paper obtained from reinforcing fibers by papermaking.

In particular, in a case where the two-dimensional random orientation of the reinforcing fibers included in the fiber-reinforced resin material or the shaped product with grains is numerically defined, two-dimensional orientation described in JP-A-2012-246428 is preferable in which a degree of surface orientation $\sigma$ defined by "Degree of Surface Orientation $\sigma=100\times(1-$(Number of Reinforcing Fibers having Surface Orientation Angle $\gamma$ of $10°$ or More)/(Number of All Reinforcing Fibers))" is 90% or higher.

Further, regarding an arbitrary rectangular region in a cross-section of a shaped product sample taken in a thickness direction, after setting a thickness direction of the shaped product or a direction different from the thickness direction of the shaped product as a Z direction, observation, measurement, and calculation of the degree of surface orientation $\sigma$ regarding the reinforcing fibers may be performed as described in JP-A-2012-246428. In this case, regarding an angle between a long diameter of a reinforcing fiber cross-section and a surface of a shaped plate, that is required to calculate the surface orientation angle $\gamma$, an angle between an upper side or a lower side of the rectangular region as an observation target and the long diameter of the reinforcing fiber cross-section may be used instead of the angle between the long diameter and the surface of the shaped plate.

In the present invention, a reinforcing fiber mat refers to a state where the reinforcing fibers are stacked or entangled in a mat shape. Examples of the reinforcing fiber mat include: a two-dimensional random reinforcing fiber mat in which long axis directions of the reinforcing fibers are randomly oriented in an in-plane direction of the fiber-reinforced resin shaped product; and a three-dimensional random reinforcing fiber mat in which the reinforcing fiber are entangled in a cotton shape such that long axis directions of the reinforcing fibers are randomly oriented in X, Y, and Z directions.

In the present invention, an isotropic base material refers to one configuration of the fiber-reinforced resin material in which the reinforcing fiber mat includes a thermoplastic resin. Examples of the configuration in which the reinforcing fiber mat includes a thermoplastic resin in the isotropic base material according to the present invention include: a configuration in which the reinforcing fiber mat includes a thermoplastic resin having a powder shape, a fiber shape, or a lump shape; and a configuration in which a thermoplastic resin layer including a thermoplastic resin is mounted or stacked on the reinforcing fiber mat.

In the fiber-reinforced resin material used in the present invention, one fiber-reinforced resin material may include reinforcing fibers having different orientation states.

Examples of a configuration in which the fiber-reinforced resin material includes reinforcing fibers having different orientation states include: (i) a configuration in which reinforcing fibers having different orientation states are aligned in an in-plane direction of the fiber-reinforced resin material; and (ii) a configuration in which reinforcing fibers having different orientation states are aligned in a thickness direction of the fiber-reinforced resin material. In addition, in a case where the fiber-reinforced resin material has a stacked structure including a plurality of layers, for example, (iii) a configuration in which orientation states of reinforcing fibers included in the respective layers are different from each other can be adopted. Further, a combination of the configurations (i) to (iii) may also be adopted.

The configuration of the orientation of the reinforcing fibers in the fiber-reinforced resin material can be confirmed, for example, by measuring the tensile modulus in a tensile test in which an arbitrary direction of the fiber-reinforced resin material and a direction perpendicular to the arbitrary direction are set as the reference, and then measuring a ratio (Eδ) which is obtained by dividing a higher value by a lower value among the measured tensile modulus values. As the ratio of the tensile moduli approaches 1, it can be evaluated that the reinforcing fibers are more likely to be isotropically oriented. In a case where the ratio, which is obtained by dividing a high value by a low value among the tensile modulus values in the two directions perpendicular to each other, is not higher than 2, the reinforcing fibers are evaluated as being isotropic. In a case where the ratio is lower than 1.5, the reinforcing fibers are evaluated as being highly isotropic. In a case where this ratio is not higher than 1.3, the reinforcing fibers are evaluated as being particularly highly isotropic.

The fiber areal weight of the reinforcing fibers in the fiber-reinforced resin material is not particularly limited and, typically, is preferably 25 g/m$^2$ to 10000 g/m$^2$. In a case where the shaped product with grains is manufactured by press-molding the fiber-reinforced resin material, as long as additional reinforcing fibers or an additional molding material is not added, the fiber areal weight of the reinforcing fibers in the fiber-reinforced resin material can be considered as the fiber areal weight of the reinforcing fibers in the obtained shaped product with grains.

The thickness of the fiber-reinforced resin material used in the present invention is not particularly limited and, typically, is preferably in a range of 0.01 mm to 100 mm, more preferably in a range of 0.01 mm to 5 mm, and still more preferably in a range of 1 mm to 5 mm.

In a case where the fiber-reinforced resin material according to the present invention has a configuration in which a plurality of layers are stacked, the thickness refers to not the thickness of each of the layers but the total thickness of the fiber-reinforced resin material that is the sum of the thicknesses of the respective layers.

The fiber-reinforced resin material used in the present invention may have a single-layer structure including a single layer or may have a stacked structure in which a plurality of layers are stacked.

A configuration in which the fiber-reinforced resin material has the stacked structure may be a configuration in which a plurality of layers having the same composition are stacked or may be a configuration in which a plurality of layers having different compositions are stacked.

In addition, the configuration in which the fiber-reinforced resin material has the stacked structure may be a configuration in which layers having different orientation states of reinforcing fibers are stacked. In this configuration, for example, a layer in which reinforcing fibers are oriented to one direction and a layer in which reinforcing fibers are two-dimensionally randomly oriented are stacked.

In a case where three or more layers are stacked, a sandwich structure including a given core layer and skin layers that are stacked on front and back surfaces of the core layer, respectively, may be adopted.

(Reinforcing Fibers)

As the reinforcing fibers included in the shaped product with grains or the fiber-reinforced resin material according to the present invention, carbon fibers are preferable. However, depending on the kind of the matrix resin, the use of the fiber-reinforced resin material, and the like, inorganic fibers other than carbon fibers or organic fibers may be used.

Examples of the inorganic fibers other than carbon fibers include activated carbon fibers, graphite fibers, glass fibers, tungsten carbide fibers, silicon carbide fibers, ceramic fibers, alumina fibers, natural fibers, mineral fibers such as basalt, boron fibers, boron nitride fibers, boron carbide fibers, and metal fibers.

Examples of the metal fibers include an aluminum fibers, copper fibers, brass fibers, stainless steel fibers, and steel fibers.

Examples of the glass fibers include fibers formed of E glass, C glass, S glass, D glass, T glass, quartz glass, borosilicate glass, and the like.

Examples of the organic fibers include fibers formed of aramid, polyparaphenylene benzooxazole (PBO), polyphenylene sulfide, polyester, acryl, polyamide, polyolefin, polyvinyl alcohol, polyarylate, or the like.

As the reinforcing fibers included in the shaped product with grains or the fiber-reinforced resin material according to the present invention, one or more kinds of reinforcing fibers selected from the group consisting of carbon fibers, glass fibers, aramid fibers, boron fibers, and basalt fibers having an weight average fiber length in a range described below are more preferable.

In the present invention, it is preferable that one kind of reinforcing fibers among the various kinds of fibers are used because a molding material or a shaped product can be easily manufactured. However, optionally, two or more kinds of reinforcing fibers may be used in combination. In this case, plural kinds of inorganic fibers may be used in combination, plural kinds of organic fibers may be used in combination, or inorganic fibers and organic fibers may be used in combination.

Examples of the configuration in which plural kinds of inorganic fibers are used in combination include a configuration in which carbon fibers and metal fibers are used in combination, and a configuration in which carbon fibers and glass fibers are used in combination. On the other hand, examples of the configuration in which plural kinds of organic fibers are used in combination include a configuration in which aramid fibers and fibers formed of another organic material are used in combination. Further, examples of the configuration in which inorganic fibers and organic fibers are used in combination include a configuration in which carbon fibers and aramid fibers are used in combination.

In the present invention, carbon fibers are preferably used as the reinforcing fibers. By using the carbon fibers, a light-weight fiber-reinforced resin material having a high strength can be obtained.

As the carbon fibers, for example, polyacrylonitrile (PAN)-based carbon fibers, petroleum and coal pitch-based carbon fibers, rayon-based carbon fibers, cellulose-based carbon fibers, lignin-based carbon fibers, phenol-based carbon fibers, or vapor-grown-based carbon fibers are known. In the present invention, among the above-described carbon fibers, any kind of carbon fibers can be preferably used.

Among these, in the present invention, polyacrylonitrile (PAN)-based carbon fibers are preferably used from the viewpoint of obtaining an excellent tensile strength. In a case where the PAN-based carbon fibers are used as the reinforcing fibers, the tensile modulus thereof is preferably in a range of 100 GPa to 600 GPa, more preferably in a range of 200 GPa to 500 GPa, and still more preferably in a range of 230 GPa to 450 GPa. In addition, the tensile strength is preferably in a range of 2000 MPa to 10000 MPa and more preferably in a range of 3000 MPa to 8000 MPa.

In order to improve adhesiveness with the matrix resin, a sizing agent may be attached to surfaces of the reinforcing fibers used in the present invention. In a case where the reinforcing fibers to which the sizing agent is attached are used, the kind of the sizing agent can be appropriately selected depending on the kinds of the reinforcing fibers and a matrix resin without any particular limitation.

Regarding the adhesion strength between the reinforcing fibers and the matrix resin, a strength measured in a strand tensile shear test is preferably 5 MPa or higher. This strength can be improved using the following method: a method of selecting the matrix resin and, for example, in a case where the reinforcing fibers are carbon fibers, changing a surface oxygen concentration ratio (O/C); or a method of imparting a sizing agent to carbon fibers to improve the adhesion strength between the carbon fibers and the matrix resin.

In the present invention, in a case where at least a part of the reinforcing fibers is in the form of single fibers, the effect is extremely significant. On the other hand, in order to improve fluidity of the fiber-reinforced resin material during molding, it is preferable that a part of the reinforcing fibers forms bundles of single fibers. The reinforcing fibers used in the present invention may be in the form of only single fibers or may be in the form of only bundles of single fibers. However, in a case where the reinforcing fibers are in the form of both single fibers and bundles of single fibers, the effects of the present invention are more significant. A bundle of single fibers refers to a state in which two or more reinforcing single fibers are adjacent to each other due to a sizing agent, an electrostatic force, or the like and are present in a bundle. The number of reinforcing single fibers forming a bundle of single fibers is preferably 280 or more and more preferably 600 or more.

In the present invention, In a case where the reinforcing fibers are used in the form of a bundle of single fibers, the number of single fibers constituting each bundle of single fibers may be substantially the same as or different from that constituting another bundle of single fibers.

The weight average fiber length of the reinforcing fibers included in the shaped product with grains or the fiber-reinforced resin material according to the present invention is 100 mm or less. In a case where the weight average fiber length of the reinforcing fibers is in the above-described range, in the shaped product with grains, an effect of improving the appearance due to a difference between a flowing surface and a non-flowing surface is likely to be obtained by the grains. The weight average fiber length is preferably 1 mm to 100 mm, more preferably 5 mm to 100 mm, and still more preferably 10 mm to 100 mm.

As the reinforcing fibers used in the present invention, discontinuous fiber having a weight average fiber length of 100 mm or less and having a high strength and high dimensional isotropy as described above may be used, and continuous fiber may also be used according to the purpose.

In the present invention, reinforcing fibers having different fiber lengths may be used in combination. In other words, the average fiber length of the reinforcing fibers used in the present invention may have a single peak or a plurality of peaks.

The average fiber length of the reinforcing fibers can be obtained based on the following Expressions (m) and (f) after measuring the fiber lengths of 100 fibers, which are randomly extracted from the fiber-reinforced resin material, using a caliper or the like in units of 1 mm. The reinforcing fibers can be extracted from the fiber-reinforced resin material, for example, using an extraction method of heating the fiber-reinforced resin material at 500° C. for 1 hour to remove the resin therefrom in a furnace.

$$\text{Number Average Fiber Length } Ln=\Sigma Li/j \quad (m)$$

(where Li represents the fiber lengths of the reinforcing fibers, and j represents the number of the reinforcing fibers).

$$\text{Weight Average Fiber Length } Lw=(\Sigma Li^2)/(\Sigma Li) \quad \text{Expression (f)}$$

(where Li represents the fiber lengths of the reinforcing fibers).

In a case where the fiber lengths are fixed, for example, in a case where the reinforcing fibers are cut using a rotary cutter, the number average fiber length can be considered as the weight average fiber length.

In the present invention, any one of the number average fiber length and the weight average fiber length may be used. However, in order to more correctly reflect physical properties of the fiber-reinforced resin material, the weight average fiber length is used in many cases.

The single fiber diameters of the reinforcing fibers used in the present invention may be appropriately determined depending on the kind of the reinforcing fibers without any particular limitation.

For example, in a case where carbon fibers are used as the reinforcing fibers, typically, the average single fiber diameter is preferably in a range of 3 μm to 50 μm, more preferably in a range of 4 μm to 12 μm, and still more preferably in a range of 5 μm to 8 μm.

On the other hand, for example, in a case where glass fibers are used as the reinforcing fibers, typically, the average single fiber diameter is preferably in a range of 3 μm to 30 μm.

Here, the average single fiber diameter refers to the average diameter of single fibers of the reinforcing fibers as can be seen from the term. However, in a case where the reinforcing fibers are in the form of bundles of single fibers, the average single fiber diameter can also be abbreviated as "average fiber diameter".

The average single fiber diameter of the reinforcing fibers can be measured using a method described in JIS R-7607 (2000).

As described above, it is preferable that the reinforcing fibers used in the present invention include bundle of single fibers, that is, bundles in which two or more reinforcing single fibers are adjacent to each other due to a sizing agent, an electrostatic force, or the like. Regarding the present invention, a bundle of single fibers of reinforcing fibers will also be referred to as "reinforcing fiber bundle". One reinforcing fiber bundle functions as one filler in the fiber-reinforced resin shaped product or the molding material thereof. A reinforcing fiber sample is obtained by removing the thermoplastic resin as the matrix from the fiber-reinforced resin shaped product or the molding material, and respective reinforcing fibers are randomly collected from the reinforcing fiber sample using tweezers or the like. In this case, in a case where the collected reinforcing fibers are a bundle of plural single fibers, this bundle can be considered as a reinforcing fiber bundle.

In a representative form of the reinforcing fiber bundle, a plurality of single fibers face substantially the same direction, and longitudinal surfaces thereof are adjacent to each other to form a bundle. However, the reinforcing fiber bundle is not limited to the representative form. For example, the reinforcing fiber bundle may be a bundle in which a plurality of single fibers face different directions, or may be a bundle in which some of longitudinal surfaces of a plurality of single fibers are adjacent to each other but other portions are distant from each other.

In a case where the reinforcing fibers used in the present invention are in the form of bundle of single fibers, the number of single fibers constituting each bundle of single fibers is not particularly limited and is typically in a range of 2 to 100000.

For example, in general, the carbon fiber is in the form of bundles of single fibers in which several thousands to several ten thousands of single fibers are gathered.

In a case where carbon fibers or the like are used as the reinforcing fibers, when the carbon fibers are used in the form of bundles of single fibers, an entangled portion of the bundles of single fibers becomes locally thick, and it may be difficult to obtain a thin-walled fiber-reinforced resin material. Therefore, in a case where the reinforcing fiber are used in the form of bundles of single fibers, typically, the bundles of single fibers are widened or opened and then used.

In a case where the bundles of single fibers of reinforcing fibers are widened or opened, in the reinforcing fibers according to the present invention, a proportion of the amount of reinforcing fibers (A) composed of a critical single fiber number or more of single fibers with respect to the total amount of the reinforcing fibers is preferably 20 vol % or higher, more preferably 30 vol % or higher, still more preferably 40 vol % or higher, and still more preferably 50 vol % or higher, the critical single fiber number being defined by the following Expression (1):

$$\text{Critical Single Fiber Number} = 600/D \quad (1)$$

(wherein D represents an average fiber diameter (μm) of the reinforcing single fibers).

As reinforcing fibers other than the reinforcing fibers (A), single fibers or a bundle of single fibers including less than the critical single fiber number of single fibers (hereinafter, also may be referred to as reinforcing fibers (B)) may be present. In the reinforcing fibers according to the present invention, by reducing the thickness of the reinforcing fibers (A) including the specific number or more of single fibers and adjusting the number of bundles of the reinforcing fibers (A) per reinforcing fiber unit weight (g) to be in a specific range, unevenness in the thickness of the fiber-reinforced resin material can be reduced. Therefore, a fiber-reinforced resin shaped product that is thin but has satisfactory mechanical properties can be obtained by molding.

It is preferable that the proportion of the amount of the reinforcing fibers (A) with respect to the total amount of the carbon fibers is 20 vol % or higher because a fiber-reinforced composite material having a high volume fraction of reinforcing fibers can be obtained during molding of the fiber-reinforced resin material according to the present invention. On the other hand, it is preferable that the upper limit of the proportion of the amount of the reinforcing fibers (A) is 99 vol %. In a case where the proportion of the amount of the reinforcing fibers (A) with respect to the total amount of the reinforcing fibers (A) is 99 vol % or lower, gaps between the reinforcing fibers do not increase, a composite material having a high mechanical strength can be obtained. The proportion of the amount of the reinforcing fibers (A) with respect to the total amount of the reinforcing fibers is more preferably 50 vol % or higher and lower than 99 vol %. The upper limit of the proportion of the amount of the reinforcing fibers (A) with respect to the total amount of the reinforcing fibers is more preferably 95 vol % or lower and still more preferably 90 vol % or lower.

As described above, the reinforcing fibers (A) is a bundle of reinforcing single fibers and thus will also be referred to as "reinforcing fiber bundle (A)". Likewise, the average single fiber number of the reinforcing fibers (A) will also be abbreviated as "average fiber number".

(Thermoplastic Resin)

The shaped product with grains or the fiber-reinforced resin material according to the present invention includes a thermoplastic resin as a matrix resin. In addition, in the present invention, as the matrix resin, a thermosetting resin may also be used in combination as long as the thermoplastic resin is included as a major component.

The thermoplastic resin is not particularly limited, and any thermoplastic resin having a desired softening temperature can be appropriately selected and used depending on the use of the shaped product with grains or the like.

Typically, as the thermoplastic resin, a thermoplastic resin having a softening temperature in a range of 180° C. to 350° C. is used, but the present invention is not limited thereto. Regarding the present invention, the softening temperature of the thermoplastic resin refers to a crystalline melting temperature, that is, a melting point in the case of a crystalline thermoplastic resin, and refers to a glass transition point in the case of an amorphous thermoplastic resin.

Examples of the thermoplastic resin include one or more resins selected from the group consisting of a polyolefin resin, a polystyrene resin, a thermoplastic polyamide resin, a polyester resin, a polyacetal resin (polyoxymethylene resin), a polycarbonate resin, a (meth)acrylic resin, a polyarylate resin, a polyphenylene ether resin, a thermoplastic polyimide resin, a polyether nitrile resin, a phenoxy resin, a polyphenylene sulfide resin, a polysulfone resin, a polyketone resin, a polyether ketone resin, a thermoplastic urethane resin, a fluororesin, and a thermoplastic polybenzimidazole resin.

Examples of the polyolefin resin include one or more resins selected from the group consisting of a polyethylene resin, a polypropylene resin, a polybutadiene resin, a polymethyl pentene resin, a vinyl chloride resin, a vinylidene chloride resin, a vinyl acetate resin, and a polyvinyl alcohol resin.

Examples of the polystyrene resin include one or more resins selected from the group consisting of a polystyrene resin, an acrylonitrile-styrene resin (AS resin), and an acrylonitrile-butadiene-styrene resin (ABS resin).

Examples of the polyamide resin include one or more resins selected from the group consisting of a polyamide 6 resin (nylon 6), a polyamide 11 resin (nylon 11), a polyamide 12 resin (nylon 12), a polyamide 46 resin (nylon 46), a polyamide 66 resin (nylon 66), and a polyamide 610 resin (nylon 610).

Examples of the polyester resin include a polyethylene terephthalate resin, a polyethylene naphthalate resin, a polybutylene terephthalate resin, a polytrimethylene terephthalate resin, and liquid crystal polyester. Examples of the (meth)acrylic resin include polymethyl methacrylate.

Examples of the modified polyphenylene ether resin include modified polyphenylene ether.

Examples of the thermoplastic polyimide resin include thermoplastic polyimide, a polyamide imide resin, and a polyetherimide resin.

Examples of the polysulfone resin include one or more resins selected from the group consisting of a modified polysulfone resin, a polyether sulfone resin and the like.

Examples of the polyether ketone resin include one or more resins selected from the group consisting of a polyether ketone resin, a polyether ether ketone resin, and a polyether ketone ketone resin.

Examples of the fluororesin include polytetrafluoroethylene.

As the thermoplastic resin used in the present invention, one kind may be used alone, or two or more kinds may be used in combination. Examples of the configuration where two or more kinds of thermoplastic resins are used in combination include a configuration where thermoplastic resins having different softening temperatures are used in combination, and a configuration where thermoplastic resins having different average molecular weights are used in combination. However, the present invention is not limited to these examples.

(Method of Manufacturing Fiber-Reinforced Resin Material)

The fiber-reinforced resin material used in the present invention can be manufactured using a well-known method.

For example, in a case where the thermoplastic resin is used as the matrix resin, the fiber-reinforced resin material can be manufactured through the following steps: 1. a step of cutting the reinforcing fibers; 2. a step of opening the cut reinforcing fibers; and 3. a step of obtaining a fiber-reinforced resin material by mixing the opened reinforcing fibers with the matrix resin in the form of a fiber or particles to obtain an isotropic base material and then heating and compressing the isotropic base material to impregnate the opened reinforcing fibers with the thermoplastic resin. However, the present invention is not limited to this method.

The isotropic base material (also referred to as "two-dimensional random oriented mat") and a method of manufacturing the same are described in detail in WO2012/105080 and JP-A-2013-49298.

That is, a strand including a plurality of reinforcing fibers is continuously slit along a fiber length direction to obtain a plurality of strands having a small width of 0.05 mm to 5 mm. Next, the strands are continuously cut to have an average fiber length of 3 mm to 100 mm, and gas is blown to the cut reinforcing fibers to open the reinforcing fibers such that reinforcing fibers including a smaller number of single fibers are obtained. In this state, the reinforcing fibers are stacked on a gas-permeable conveyor net. As a result, a mat can be obtained. At this time, the mat can also be manufactured using a method of manufacturing an isotropic base material including a thermoplastic resin by stacking the thermoplastic resin in the form of particles or short fibers on the gas-permeable conveyor net together with the reinforcing fibers or by supplying the melted thermoplastic resin in a film shape to the mat-shaped reinforcing fiber to permeate thereinto.

The number of single fibers in the reinforcing fibers (A) can be controlled by adjusting the size of the reinforcing fibers, for example, the width of the reinforcing fibers as the bundles of single fibers or adjusting the number of single fibers per width in the cutting step of the preferable method of manufacturing the isotropic base material. Specifically, a method of increasing the width of the reinforcing fibers by widening or the like and then providing the reinforcing fibers to the cutting step or a method of providing a slitting step before the cutting step may be adopted. In addition, the cutting and slitting of the reinforcing fibers may be performed at the same time.

In the fiber-reinforced resin material in which the above-described isotropic base material is used, in a plane thereof, the reinforcing fibers are randomly dispersed and disposed without being oriented to a specific direction. That is, the fiber-reinforced resin material is a material having in-plane isotropy. By obtaining a ratio between the tensile modulus values in the two directions perpendicular to each other, the isotropy of the fiber-reinforced resin material can be quantitatively evaluated.

(Carbon Black)

The shaped product with grains or the fiber-reinforced resin material according to the present invention may include carbon black in addition to the reinforcing fibers and the thermoplastic resin as the matrix resin. In the present invention, carbon black can be obtained by thermal decomposition or incomplete combustion of hydrocarbon of oil or natural gas or the like. Therefore, the carbon black is formed of an aggregate in which graphite described below forms a layer and that is formed of partially melted primary particles. Aggregates are agglomerated to each other to form an agglomerate due to the van der Waals force, and thus are difficult to disperse. In addition, in general, as the average primary particle size decreases, blackness becomes higher, and the tinting power also becomes higher. However, since the specific surface area is large, an interface between the carbon black and the resin increases, and the viscosity also increases. Specific examples of the carbon black used in the present invention include one or more kinds selected from the group consisting of furnace black manufactured using a furnace method, acetylene black manufactured using an acetylene method, thermal black manufactured using a thermal method, channel black manufactured using a channel method, and Ketjen black.

Among these, in order to impart high conductivity, acetylene black or Ketjen black is preferably used from the viewpoints of high crystallinity and high structure. In addition, in order to impart high blackness and high tinting power, furnace black is preferably used. In addition, the particle size, the specific surface area, the pH, and the oil absorption are not particularly limited. The average particle size is preferably 8 nm to 200 nm and more preferably 13 nm to 100 nm. The specific surface area is preferably 10 $m^2/g$ to 700 $m^2/g$ and more preferably 20 $m^2/g$ to 240 $m^2/g$. The pH is preferably 2 to 10.5 and more preferably 7 to 9.5. The oil absorption is preferably 50 mL/100 g to 320 mL/100 g and more preferably 70 mL/100 g to 180 mL/100 g.

In addition, in order to increase affinity to the resin, a surface of the carbon black may be modified with a functional group within a range where the characteristics of the composition according to the present invention do not deteriorate. For example, using an acid or an alkali, functionalization with a hydroxyl group, a carboxyl group, or an amino group may be performed. Further, the carbon black may be pre-treated with a coupling agent. Examples of the coupling agent include an isocyanate compound, an organic silane compound, an organic titanate compound, and an epoxy compound.

The content of the carbon black with respect to the total amount of the composition is preferably 0.1 wt % to 10 wt %, more preferably 0.2 wt % to 5 wt %, and still more preferably 0.5 wt % to 3 wt %. It is preferable that the content of the carbon black is 0.1 wt % or higher because an effect of improving the weather resistance of the shaped product is sufficiently exhibited. It is preferable that the content of the carbon black is 10 wt % or lower because a decrease in the strength of the shaped product is suppressed.

In addition, within a range where the object of the present invention does not deteriorate, the shaped product with grains or the fiber-reinforced resin material according to the present invention may further include additives, for example, various fibrous fillers of organic fibers or inorganic fibers or non-fibrous fillers, a flame retardant, an anti-UV agent, a stabilizer, a release agent, a pigment other than carbon black, a dye, a softening agent, a plasticizer, or a surfactant.

EXAMPLES

Hereinafter, Examples will be described, but the present invention is not limited thereto. Values in Examples were obtained using the following methods.

(1) Volume Fraction (Vf) of Reinforcing Fibers in Fiber-Reinforced Resin Material A fiber-reinforced resin material was fired in a furnace at 500° C. for 1 hour to remove a matrix resin therefrom, and the mass of the sample was weighed before and after the treatment. As a result, the content of the reinforcing fibers and the mass of the matrix resin were calculated. Next, using the specific gravities of the components, the volume of the reinforcing fibers and the volume of the matrix resin were calculated, and a volume fraction (Vf) of the reinforcing fibers in the fiber-reinforced resin material was calculated according to the following Expression (b).

$$Vf = 100 \times (\text{Volume of Reinforcing Fibers})/((\text{Volume of Reinforcing Fibers}) + (\text{Volume of Thermoplastic Resin})) \quad (b)$$

(2) Critical Single Fiber Number of Fiber-Reinforced Resin Material, Proportion of Amount of Reinforcing Fibers (A) with Respect to Total Amount of Reinforcing Fibers, Reinforcing Fiber Length The measurements were performed using methods described in WO2012/105080 or US2014/0186584A.

(3) Maximum Height (Rz) of Grains

A surface of a shaped product with grains was observed using a shape measurement laser microscope (VK-X100, manufactured by Keyence Corporation) in 9 fields of view at a measurement magnification of 10 times, and a maximum height (Rz) of grains was calculated according to JIS B 0601 (2001). In the calculation, a cutoff wavelength was 0.25 μm.

(4) Average Pitch (Rsm) of Adjacent Grains

A surface of a shaped product with grains was observed using a shape measurement laser microscope (VK-X100, manufactured by Keyence Corporation) in 9 fields of view at a measurement magnification of 10 times, and an average pitch (Rsm) of grains was calculated according to JIS B 0601 (2001). In the calculation, a cutoff wavelength was 0.25 μm.

(5) Grain Projected Area % (Sg)

A surface of a shaped product with grains was observed using a shape measurement laser microscope (VK-X100, manufactured by Keyence Corporation) in 9 fields of view at a measurement magnification of 10 times, a smooth surface having no unevenness of grains was calculated, and a grain projected area % (Sg) was calculated according to the following Expression (2).

$$Sg = 100 \times (\text{Area of All Fields of View} - \text{Area of Smooth Surface having No Unevenness of Grains})/\text{Area of All Fields of View} \quad (2)$$

(6) Appearance of Shaped Product

Whether the appearance of a shaped product was good or bad was evaluated by visual inspection from the viewpoint of whether or not a boundary between a flowing portion and a non-flowing portion of a shaped product surface was recognizable.

The boundary was not recognizable by visual inspection: Excellent (the appearance was extremely good)

The boundary was not substantially recognizable by visual inspection: Good (the appearance was good)

The boundary was recognizable by visual inspection on closer look: Fair (the appearance was slightly good)

The boundary was recognizable by visual inspection: Bad (the appearance was bad)

(7) Weather Resistance (Appearance after Weathering Deterioration Test)

A shaped product was provided in an I-Super UV tester (SUV-W151, manufactured by Iwasaki Electric Co., Ltd.), and a weathering test was performed under conditions of black panel temperature: 70° C., test humidity: 50%, UV irradiation intensity: 900 W/m$^2$, rainfall conditions: 30 seconds of rainfall during 60 minutes, and irradiation time: 90 hours. The degrees of deterioration of the appearances of a UV-non-irradiated sample and a UV-irradiated sample were compared to each other, and weather resistance was evaluated based on the following criteria by visual inspection and using a shape measurement laser microscope (VK-X100, manufactured by Keyence Corporation).

The deterioration was not recognizable by visual inspection: Excellent (the weather resistance was extremely good)

The deterioration was not substantially recognizable by visual inspection: Good (the weather resistance was good)

The deterioration was recognizable by visual inspection on closer look: Fair (the weather resistance was slightly good)

The deterioration was recognizable by visual inspection: Bad (the weather resistance was bad)

(8) Resin Proportions in Grains and Inner Portion of Shaped Product with Grains

A thermoplastic resin used in Examples and Comparative Examples of the present invention shown in Table 1 was nylon 6 that is a crystalline resin. Therefore, heat of fusion was measured by differential scanning calorimetry, and a resin proportion in grains and a resin proportion in an inner portion were measured. On the other hand, in the case of an amorphous resin, it is difficult to measure heat of fusion. Therefore, in this case, a reinforcing fiber proportion was measured by thermogravimetry, and then a resin proportion was calculated.

(Heat of Fusion of Grains)

About 6 mg of a grain portion was cut from a surface of a shaped product with grains using a cutter to obtain a sample, this sample was put into an aluminum sample pan, was mounted on a sample holder X-DSC7000 (manufactured by SII NanoTechnology Inc.), was heated from 40° C. to 280° C. at a rate of 20° C. per minute in a nitrogen atmosphere, was held at this temperature for 3 minutes, and was cooled from 40° C. at a rate of 20° C. per minute. Once the temperature reached 40° C., the sample was held at this temperature for 3 minutes, and then was heated to 280° C. at a rate of 20° C. per minute. Under the above-described conditions, differential scanning calorimetry was performed, and heat of fusion (heat of fusion of grains) during the second heating was measured.
(Heat of Fusion of Inner Portion of Shaped Product with Grains)

A back surface of a shaped product with grains as a glossy surface was scraped off by about 1 mm using a metal file to expose an inner portion, about 6 mg of a sample was cut from the inner portion using a cutter, and this sample was put into an aluminum sample pan. Using the same method as that of the heat of fusion of grains except for the above-described conditions, heat of fusion during the second heating was measured as the heat of fusion of the inner portion of the shaped product with grains.
(Resin Proportion in Grains)

A resin proportion in grains was calculated according to the following Expression.

$$\text{Resin Proportion (\%) in Grains} = 100 \times (100 - Vf) \times (\text{Heat of Fusion of Grains})/(\text{Heat of Fusion of Inner Portion of Shaped Product with Grains}) \quad (3)$$

(Resin Proportion in Inner Portion)

A resin proportion in an inner portion was calculated according to the following Expression.

$$\text{Resin Proportion (\%) in Inner Portion} = 100 - Vf \quad (4)$$

(9) Tensile Strength

A tensile strength of a shaped product was measured according to JIS K 7164, ISO 527-1, and ISO-527-2.
(10) Warpage of Shaped Product One side of a fiber-reinforced resin shaped product was fixed to a flat plate, and the height of a portion most distant from the flat plate was measured using a ruler.
(Manufacturing of Fiber-Reinforced Resin Material)

Manufacturing Example 1

As reinforcing fibers, PAN-based carbon fibers "TENAX" (registered trade name) STS40-24KS (manufactured by Toho Tenax Co., Ltd.; average single fiber diameter: 7 μm; number of single fibers: 24000) treated with a nylon sizing agent were used. As a matrix resin, a nylon 6 resin A1030 (manufactured by Unitika Ltd.) was used. According to a method described in WO2012/105080, an in-plane isotropic base material was prepared in which a carbon fiber areal weight was 1441 g/m², a nylon 6 resin areal weight was 1704 g/m², and the carbon fibers having a weight average fiber length of 20 mm were two-dimensionally randomly oriented.

The obtained isotropic base material was heated and pressed at 2.0 MPa for 5 minutes in a press machine heated to 260° C. using a mold having a recess portion in an upper portion. As a result, a fiber-reinforced resin material having a thickness of 2.3 mm and a volume fraction (Vf) of the reinforcing fibers of 35% in which the reinforcing fibers were two-dimensionally randomly oriented was obtained.

In the reinforcing fibers included in the fiber-reinforced resin material, the weight average fiber length was 20 mm, the critical single fiber number was 86, and the proportion of the amount of the reinforcing fibers (A) including the critical single fiber number or more of carbon single fibers with respect to the total amount of the reinforcing fibers was 85 vol %. In the fiber-reinforced resin material, as reinforcing fibers other than reinforcing fibers (A), carbon fibers in the form of a bundle including less than the critical single fiber number of carbon single fibers and carbon fibers in the form of single fibers were present.

Manufacturing Example 2

1.0 part by weight of "BP800" (manufactured by Cabot Corporation; particle size: 17 nm, specific surface area: 210 m²/g, oil absorption: 68 mL/100 g) and 1.5 part by weight of "#850" (manufactured by Mitsubishi Chemical Corporation; particle size: 17 nm, specific surface area: 220 m²/g, oil absorption: 77 mL/100 g) were added with respect to 100 parts by weight of a nylon 6 resin (A1030, manufactured by Unitika Ltd.). The components were melt-kneaded using a 30 mmφ twin screw extruder (manufactured by Toshiba Machine Co., Ltd., TEM-26SS-10/1V) under conditions of cylinder temperature: 260° C., screw rotation speed: 200 rpm, and discharge amount: 20 kg/hr. This kneaded product was used as the matrix resin. Using the same method as in Manufacturing Example 1 except for the above-described conditions, a fiber-reinforced resin material having a thickness of 2.3 mm and a volume fraction (Vf) of the reinforcing fibers of 35% in which the reinforcing fibers were two-dimensionally randomly oriented was obtained.

In the reinforcing fibers (carbon fibers) included in the fiber-reinforced resin material, the critical single fiber number was 86, the proportion of the amount of the critical single fiber number or more of carbon fibers (A) was 85 vol %, and the weight average fiber length was 20 mm. In the fiber-reinforced resin material, as reinforcing fibers other than reinforcing fibers (A), carbon fibers in the form of a bundle including less than the critical single fiber number of carbon single fibers and carbon fibers in the form of single fibers were present.

Manufacturing Example 3

Based on the description of US2015/0191583, a fiber-reinforced resin material was obtained as described below.

2-hexyldecyl p-hydroxybenzoate (EXCEPARL HD-PB, manufactured by Kao Corporation) was used as an impregnation aid, and this impregnation aid was emulsified to obtain a solution having a non-volatile content of 12 wt %. As carbon fibers, PAN-based carbon fiber strands (corresponding to STS4024K, manufactured by Toho Tenax Co., Ltd.; single fiber diameter: 7.0 μm, number of single fibers: 24000, tensile strength: 4000 MPa) were caused to pass through the solution. Next, an excess amount of solution attached to the carbon fibers was removed using a nip roll. Further the carbon fibers to which the impregnation aid was attached were caused to pass through a hot air drying furnace heated to 180° C. for 2 minutes to dry the carbon fibers. As a result, easily impregnable carbon fibers were obtained. The easily impregnable carbon fibers were caused to pass through two metallic rolls having a diameter of 60 mm heated to 200° C. and were heated again. As a result, easily impregnable carbon fibers in which the impregnation aid was more uniformly attached to the carbon fibers were obtained. The content of the impregnation aid in the easily impregnable carbon fibers was 6 wt % (6.4 parts by weight with respect to 100 parts by weight of the carbon fibers).

Next, the easily impregnable carbon fibers obtained as described above were coated with a nylon 6 resin A1030 (manufactured by Unitika Ltd.) using a crosshead die for electrical-wire coating having an outlet diameter of 3 mm and cut into a length of 6 mm. As a result, a molding material as a core-sheath pellet suitable for injection molding having a carbon fiber content of 30 mass % (the amount of nylon 6 was 221 parts by mass with respect to 100 parts by mass of the carbon fibers), a diameter of 3.2 mm, and a length of 6 mm was obtained. Using a 110 ton electric injection molding machine (J110AD; manufactured by The Japan Steel Works Ltd.), injection molding was performed on the molding material at a molding cycle of 35 seconds at cylinder temperatures of C1/C2/C3/C4/N=280° C./290° C./290° C./290° C./280° C. (C1 to C4 represent cavities, and N represents a nozzle). As a result, a dumbbell for a tensile test having a thickness of 4 mm and a fiber-reinforced resin material having a size of 200×200 mm×Thickness 2.3 mm for manufacturing a shaped product with grains were obtained.

(Method of Manufacturing Shaped Product with Grains)

Unless specified otherwise, the following method of manufacturing a shaped product were adopted in Examples and Comparative Examples.

A flat plate mold having a specific grain pattern and a product surface size of 210×100 mm was prepared and was attached to a 200 ton (1960 kN) servo press machine (manufactured by Hoden Seimitsu Kako Kenkyusho Co., Ltd.).

A predetermined fiber-reinforced resin material was cut into a size of 190×90 mm, was heated to 300° C. using an infrared heater, was mounted on the flat plate mold heated to 150° C., and was compression-molded under conditions of press pressure of the servo press machine: 42 ton (412 kN), clamping rate: 20 mm/sec. As a result, a shaped product was obtained.

Example 11

A shaped product with grains was obtained according to the procedure of the above-described manufacturing method by using the fiber-reinforced resin material according to Manufacturing Example 1 and a flat plate mold having a grain pattern of TH-1008 (manufactured by Tanazawa Hakkosha Co., Ltd.), a grain depth of 100 μm, and a draft angle of 10°. The fiber areal weight of the reinforcing fibers, the weight average fiber length, the proportion of the amount of the reinforcing fibers (A), and the state of the reinforcing fibers such as two-dimensional random orientation in the fiber-reinforced resin material were substantially maintained even in the shaped product with grains.

Figure 1:
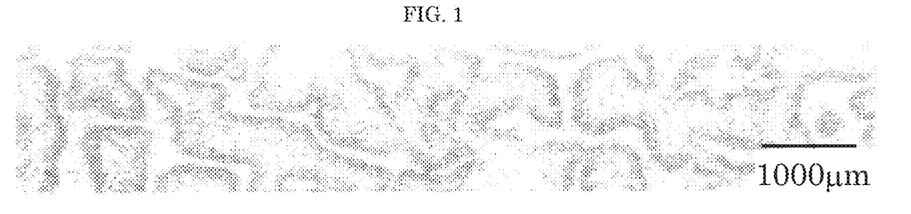
FIG. 1 is a photograph (measurement magnification: 10 times) showing the grain appearance of a shaped product with grains according to Example 1.

FIG. 1 shows the grain appearance of the shaped product with grains observed using a shape measurement laser microscope (VK-X100, manufactured by Keyence Corporation) at a measurement magnification of 10 times. As can be seen from the results of Table 1, the shaped product with grains having a high strength and a satisfactory dimension was obtained in which substantially no difference in appearance between a non-flowing portion and a flowing portion appeared, and deterioration in appearance caused by weathering deterioration was suppressed.

Example 2

Figure 2:
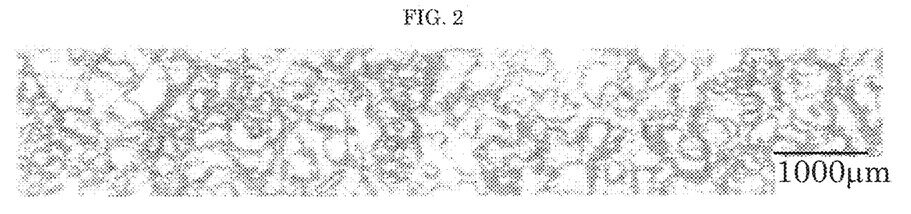
FIG. 2 is a photograph (measurement magnification: 10 times) showing the grain appearance of a shaped product with grains according to Example 2.

A shaped product with grains was obtained by performing the same operation as in Example 1 except that a flat plate mold having a grain pattern of TH-176B (manufactured by Tanazawa Hakkosha Co., Ltd.), a grain depth of 100 μm, and a draft angle of 10° was used. FIG. 2 shows the grain appearance (measurement magnification: 10 times) of the obtained shaped product with grains. As can be seen from the results of Table 1, the shaped product with grains having a high strength and a satisfactory dimension was obtained in which substantially no difference in appearance between a non-flowing portion and a flowing portion appeared, and deterioration in appearance caused by weathering deterioration was suppressed. The fiber areal weight of the reinforcing fibers, the weight average fiber length, the proportion of the amount of the reinforcing fibers (A), and the state of the reinforcing fibers such as two-dimensional random orientation in the fiber-reinforced resin material were substantially maintained even in the shaped product with grains.

Example 3

Figure 3:
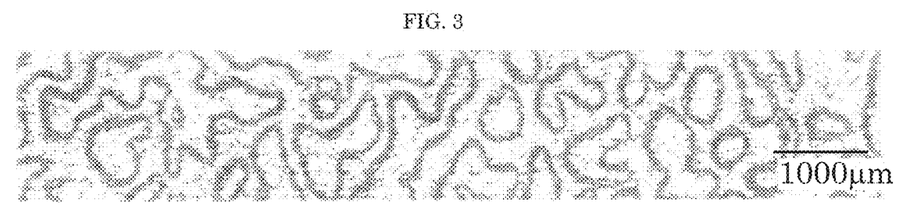
FIG. 3 is a photograph (measurement magnification: 10 times) showing the grain appearance of a shaped product with grains according to Example 3.

A shaped product with grains was obtained by performing the same operation as in Example 1 except that a flat plate mold having a grain pattern of T-1709 (manufactured by Tenibac, Inc.), a grain depth of 70 μm, and a draft angle of 8° was used. FIG. 3 shows the grain appearance (measurement magnification: 10 times) of the obtained shaped product with grains. As can be seen from the results of Table 1, the shaped product with grains having a high strength and a satisfactory dimensional stability was obtained in which substantially no difference in appearance between a non-flowing portion and a flowing portion appeared, and deterioration in appearance caused by weathering deterioration was suppressed. The fiber areal weight of the reinforcing fibers, the weight average fiber length, the proportion of the amount of the reinforcing fibers (A), and the state of the reinforcing fibers such as two-dimensional random orientation in the fiber-reinforced resin material were substantially maintained even in the shaped product with grains.

Example 4

Figure 4:
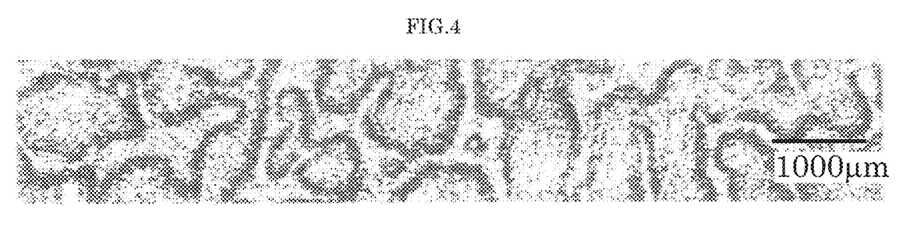
FIG. 4 is a photograph (measurement magnification: 10 times) showing the grain appearance of a shaped product with grains according to Example 4.

A shaped product with grains was obtained by performing the same operation as in Example 1 except that the fiber-reinforced resin material according to Manufacturing Example 2 was used and a flat plate mold having a grain pattern of TH-1008 (manufactured by Tanazawa Hakkosha Co., Ltd.), a grain depth of 100 μm, and a draft angle of 10° was used. FIG. 4 shows the grain appearance (measurement magnification: 10 times) of the obtained shaped product with grains. As can be seen from the results of Table 1, the shaped product with grains having a high strength and a satisfactory dimension was obtained in which substantially no difference in appearance between a non-flowing portion and a flowing portion appeared due to the higher carbon black content than Example 1, and deterioration in appearance caused by weathering deterioration was further suppressed. The fiber areal weight of the reinforcing fibers, the weight average fiber length, the proportion of the amount of the reinforcing fibers (A), and the state of the reinforcing fibers such as two-dimensional random orientation in the fiber-reinforced resin material were substantially maintained even in the shaped product with grains.

Example 5

Figure 5:
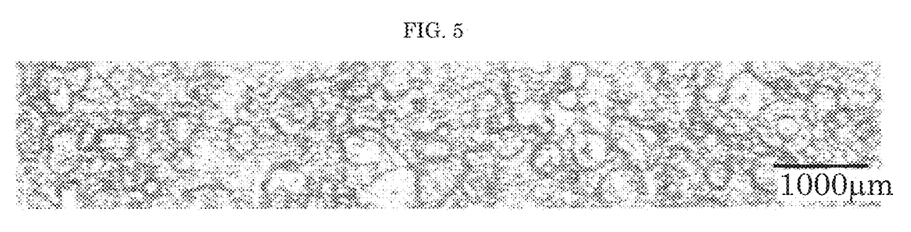
FIG. 5 is a photograph (measurement magnification: 10 times) showing the grain appearance of a shaped product with grains according to Example 5.

A shaped product with grains was obtained by performing the same operation as in Example 1 except that a flat plate mold having a grain pattern of TH-176B (manufactured by Tanazawa Hakkosha Co., Ltd.), a grain depth of 40 μm, and a draft angle of 4° was used. FIG. 5 shows the grain appearance (measurement magnification: 10 times) of the obtained shaped product with grains. As can be seen from the results of Table 1, a shaped product with grains in which a difference in resin proportion between the grain portion and the inner portion was smaller than that of Example 1, a difference in appearance between a non-flowing portion and a flowing portion appeared, and the effect of suppressing deterioration in appearance caused by weathering deterioration was slightly low, but which has a high strength and satisfactory dimensional stability was obtained. The fiber areal weight of the reinforcing fibers, the weight average fiber length, the proportion of the amount of the reinforcing fibers (A), and the state of the reinforcing fibers such as two-dimensional random orientation in the fiber-reinforced resin material were substantially maintained even in the shaped product with grains.

Example 6

Figure 6:
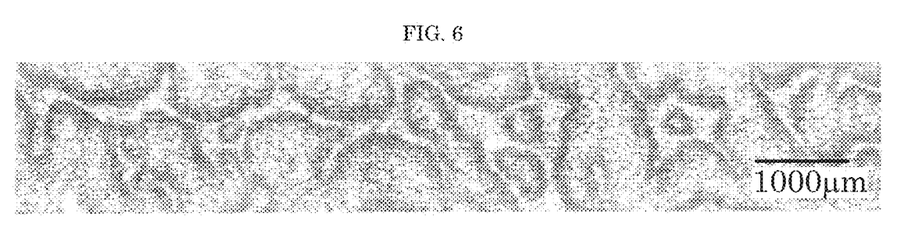
FIG. 6 is a photograph (measurement magnification: 10 times) showing the grain appearance of a shaped product with grains according to Example 6.

A shaped product with grains was obtained by performing the same operation as in Example 1 except that the fiber-reinforced resin material according to Manufacturing Example 3 was used and a flat plate mold having a grain pattern of TH-1008 (manufactured by Tanazawa Hakkosha Co., Ltd.), a grain depth of 100 μm, and a draft angle of 10° was used. FIG. 6 shows the grain appearance (measurement magnification: 10 times) of the obtained shaped product with grains. As can be seen from the results of Table 1, in the obtained shaped product with grains, the appearance and the weathering deterioration were the same as those of Example 1. However, the tensile strength was slightly lower, and the warpage was large although it was attempted to manufacture a shaped product with grains having a flat plate shape. The reason for this is presumed to be that the weight average fiber length of the reinforcing fibers included in the shaped product with grains was short at 0.9 mm.

Comparative Example 1

Figure 7:
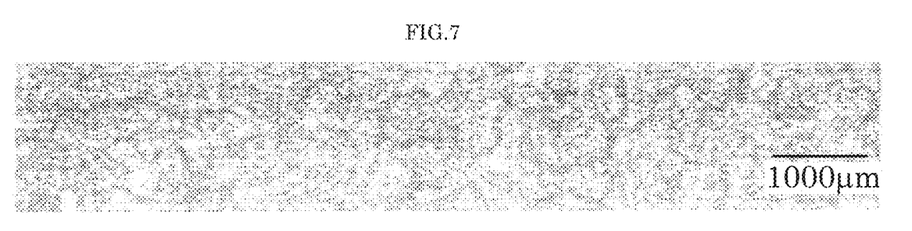
FIG. 7 is a photograph (measurement magnification: 10 times) showing the grain appearance of a shaped product with grains according to Comparative Example 1.

A shaped product with grains was obtained by performing the same operation as in Example 1 except that a flat plate mold having a grain pattern of TH-1008 (manufactured by Tanazawa Hakkosha Co., Ltd.), a grain depth of 40 μm, and a draft angle of 4° was used. FIG. 7 shows the grain appearance (measurement magnification: 10 times) of the obtained shaped product with grains. As can be seen from the results of Table 1, in the obtained shaped product with grains, a difference in appearance between a non-flowing portion and a flowing portion clearly appeared as compared to Example 1, and an effect of suppressing deterioration in appearance caused by weathering deterioration was not obtained. The fiber areal weight of the reinforcing fibers, the weight average fiber length, the proportion of the amount of the reinforcing fibers (A), and the state of the reinforcing fibers such as two-dimensional random orientation in the fiber-reinforced resin material were substantially maintained even in the shaped product with grains.

Comparative Example 2

A shaped product was obtained by using a flat plate mold having no grain pattern and having a #600 polished, that is, mirror-finished product surface. As can be seen from the results of Table 1, in the obtained shaped product, a difference in appearance between a non-flowing portion and a flowing portion clearly appeared as compared to Example 1, and an effect of suppressing deterioration in appearance caused by weathering deterioration was not obtained.

INDUSTRIAL APPLICABILITY

The fiber-reinforced resin shaped product having grains on at least a part of a surface according to the present invention can be used for various applications such as vehicles, airplanes, and OA.

The present invention has been described in detail with reference to the specific embodiment. However, it is obvious to those skilled in the art that various changes and modifications can be made within a range not departing from the scope of the present invention.

The present application is based on Japanese Patent Application No. 2015-256370 filed on Dec. 28, 2015, the content of which is incorporated herein by reference.

TABLE 1

| | | | Example 1 | Example 2 | Example 3 | Example 4 | Example 5 | Example 6 | Comparative Example 1 | Comparative Example 2 |
|---|---|---|---|---|---|---|---|---|---|---|
| Fiber-Reinforced Resin Molding Material | | | Manufacturing Example 1 | Manufacturing Example 1 | Manufacturing Example 1 | Manufacturing Example 2 | Manufacturing Example 1 | Manufacturing Example 3 | Manufacturing Example 1 | Manufacturing Example 1 |
| Grains | Grain Pattern | Appearance No. | FIG. 1 TH-1008 | FIG. 2 TH-176B | FIG. 3 T-1709 | FIG. 4 TH-1008 | FIG. 5 TH-176B | FIG. 6 TH-1008 | FIG. 7 TH-1008 | — — |
| | Grain Depth | μm | 100 | 100 | 70 | 100 | 40 | 100 | 40 | — |
| | Draft Angle | Degree (°) | 10 | 10 | 8 | 10 | 4 | 10 | 4 | — |
| Shaped Product | Fiber Length | mm | 20 | 20 | 20 | 20 | 20 | 0.9 | 20 | 20 |
| | Grain Maximum Height (Rz) | μm | 110 | 135 | 116 | 105 | 106 | 117 | 87 | — |
| | Grain Average Pitch (Rsm) | μm | 778 | 482 | 630 | 822 | 716 | 744 | 1328 | — |
| | Grain Projected Area % | % | 47 | 42 | 61 | 45 | 42 | 45 | 46 | — |
| Evaluation of Shaped Product | Appearance (Boundary between Flowing Portion and Non-Flowing Portion) | Visual Inspection | Good | Good | Good | Excellent | Fair | Good | Bad | Bad |
| | Weather Resistance (Appearance after Deterioration Test) | Visual Inspection | Good | Good | Good | Excellent | Fair | Good | Bad | Bad |
| | Resin Proportion in Grains | vol % | 60 | 61 | 61 | 60 | 63 | 60 | 65 | 65 |

TABLE 1-continued

|  |  | Example 1 | Example 2 | Example 3 | Example 4 | Example 5 | Example 6 | Comparative Example 1 | Comparative Example 2 |
|---|---|---|---|---|---|---|---|---|---|
| Resin Proportion in Inner Portion | vol % | 65 | 65 | 65 | 65 | 65 | 65 | 65 |  |
| Resin Proportion in Grains-Resin Proportion in Inner Portion | vol % | −5 | −4 | −4 | −5 | −2 | −5 | 0 | — |
| Tensile Strength | MPa | 380 | 382 | 379 | 370 | 375 | 296 | 381 | 379 |
| Warpage | mm | 2.0 | 2.2 | 2.1 | 2.2 | 2.6 | 16.2 | 2.6 | 2.9 |

The invention claimed is:

1. A fiber-reinforced resin shaped product comprising:
reinforcing fibers with a weight average fiber length of 10 mm to 100 mm; and
a thermoplastic resin,
the fiber-reinforced resin shaped product having grains on at least a part of a surface thereof, wherein
a maximum height (Rz) of the grains is 100 μm to 200 μm, and
an average pitch (Rsm) between adjacent grains is 1100 μm or less;
wherein a resin proportion in the grains is lower than a resin proportion in an inner portion of the fiber-reinforced resin shaped product by 1 vol % to 10 vol %.

2. The fiber-reinforced resin shaped product having grains according to claim 1, wherein a grain projected area % (Sg) is 10% to 99%.

3. The fiber-reinforced resin shaped product according to claim 1,
wherein a resin proportion in the grains is lower than a resin proportion in an inner portion of the fiber-reinforced resin shaped product by 1 vol % to 5 vol %.

4. The fiber-reinforced resin shaped product according to claim 1, further comprising:
0.1 wt % to 10 wt % of carbon black.

5. The fiber-reinforced resin shaped product according to claim 1,
wherein the reinforcing fibers are a mixture of bundles of reinforcing single fibers, the bundles having different numbers of single fibers.

6. The fiber-reinforced resin shaped product according to claim 1,
wherein a thermoplastic resin proportion in the grains is lower than a thermoplastic resin proportion in an inner portion of the fiber-reinforced resin shaped product by 2 vol % to 5 vol %.

7. The fiber-reinforced resin shaped product according to claim 1,
a proportion of an amount of reinforcing fibers (A) that are a bundle of a critical single fiber number or more of single fibers with respect to the total amount of the reinforcing fibers is 20 vol % to 99 vol %, and the critical single fiber number is defined by the following Expression (1):

$$\text{Critical Single Fiber Number} = 600/D \quad (1),$$

(wherein D represents an average single fiber diameter (μm) of the reinforcing fibers).

8. The fiber-reinforced resin shaped product according to claim 1,
wherein draft angles of the grains are 0.1 degrees to 20 degrees.

9. The fiber-reinforced resin shaped product according to claim 1,
wherein an average pitch (Rsm) between adjacent grains is 200 μm to 1100 μm.

10. The fiber-reinforced resin shaped product according to claim 2,
wherein grains having a grain projected area % (Sg) of 20% to 90% are formed.

11. The fiber-reinforced resin shaped product according to claim 2,
wherein a maximum height (Rz) of the grains is 100 μm to 200 μm,
an average pitch (Rsm) between adjacent grains is 200 μm to 1100 μm, and
a grain projected area % (Sg) is 20% to 90%.

12. The fiber-reinforced resin shaped product according to claim 1,
wherein the reinforcing fibers are one or more kinds of fibers selected from the group consisting of carbon fibers, glass fibers, aramid fibers, boron fibers, and basalt fibers.

13. The fiber-reinforced resin shaped product according to claim 1,
wherein a content of the thermoplastic resin is 3 part by weight to 1000 parts by weight with respect to 100 parts by weight of the reinforcing fibers.

14. The fiber-reinforced resin shaped product according to claim 1,
wherein the reinforcing fibers are two-dimensionally randomly oriented.

* * * * *